United States Patent [19]

Miyoshi et al.

[11] Patent Number: 4,830,131
[45] Date of Patent: May 16, 1989

[54] VARIABLE ASSIST POWER STEERING SYSTEM

[75] Inventors: Makoto Miyoshi, Kawasaki; Koh Uchida, Sagamihara; Takashi Kurihara, Atsugi, all of Japan

[73] Assignee: Nissan Motor Co., Ltd., Yokohama, Japan

[21] Appl. No.: 151,127

[22] Filed: Feb. 1, 1988

[30] Foreign Application Priority Data

Jan. 30, 1987 [JP] Japan ................. 62-19787

[51] Int. Cl.$^4$ ............................................. B62D 5/08
[52] U.S. Cl. ..................................... 180/141; 180/143; 180/149
[58] Field of Search ............... 180/141, 142, 143, 132, 180/146, 149

[56] References Cited

U.S. PATENT DOCUMENTS

| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 |
| 4,570,735 | 2/1986 | Duffy | 180/142 |
| 4,619,339 | 10/1986 | Futaba et al. | 180/143 |
| 4,632,204 | 12/1986 | Honaga et al. | 180/142 |
| 4,669,568 | 6/1987 | Kervagoret | 180/142 |
| 4,672,885 | 6/1987 | Kervagoret | 91/450 |

FOREIGN PATENT DOCUMENTS

| 0041887 | 12/1981 | European Pat. Off. . | |
| 53560 | 6/1982 | European Pat. Off. | 180/132 |
| 2568843 | 2/1986 | France . | |
| 47-30039 | 11/1972 | Japan . | |
| 54-15232 | 2/1979 | Japan . | |
| 56-38430 | 9/1981 | Japan . | |
| 56-174363 | 12/1981 | Japan . | |
| 57-30663 | 2/1982 | Japan . | |
| 161667 | 9/1983 | Japan | 180/142 |
| 58-156459 | 9/1983 | Japan . | |
| 1073 | 1/1985 | Japan | 180/142 |
| 61-43229 | 9/1986 | Japan . | |
| 257365 | 11/1986 | Japan | 180/141 |

Primary Examiner—Kenneth R. Rice
Attorney, Agent, or Firm—Foley & Lardner, Schwartz, Jeffery, Schwaab, Mack, Blumenthal & Evans

[57] ABSTRACT

A circuit arrangement is proposed whereby a bypass flow coming out of one portion of a fluid flow distributor circuit of a power steering system during clockwise turning of a steering wheel and another bypass flow coming out another portion of the fluid flow distributor circuit during counterclockwise turning of the steering wheel are directed toward a fluid reservoir after passing through an externally controlled variable flow orifice.

9 Claims, 8 Drawing Sheets

VARIABLE ASSIST POWER STEERING SYSTEM

RELATED APPLICATIONS

The following two U.S. patent applications have been already filed and assigned to the same assignee of the present application.

(1) U.S. patent application Ser. No. 044,065, filed on Apr. 29, 1987, now pending, (Our Ref.: U137-86).

(2) U.S. patent application Ser. No. 102,412, filed on Sept. 29, 1987, now pending, (Our Ref.: U040-87).

The following five U.S. patent applications have been concurrently filed on Dec. 28, 1987 and assigned to the same assignee of the present application.

(3) U.S. patent application Ser. No. unknown, claiming priority based on Japanese Patent Application No. 61-313519 with a filing date of Dec. 27, 1986, (our ref.: U097-87).

(4) U.S. patent application Ser. No. unknown, claiming priority based on Japanese Patent Application No. 61-313521 with a filing date of Dec. 27, 1986, (our ref.: U098-87).

(5) U.S. patent application Ser. No. unknown, claiming priority based on Japanese Patent Application No. 61-313518 with a filing date of Dec. 27, 1986, (our ref.: U099-87).

(6) U.S. patent application Ser. No. unknown, claiming priority based on Japanese Patent Application No. 61-313520 with a filing date of Dec. 27, 1986, (our ref.: U100-87).

(7) U.S. patent application Ser. No. unknown, claiming priority based on Japanese Patent Application No. 61-313517 with a filing date of Dec. 27, 1986, (our ref.: U101-87).

The following three U.S. patent applications have been concurrently filed and assigned to the same assignee of the present application.

(8) U.S. patent application Ser. No. unknown, claiming priority based on Japanese Patent Application No. 62-19784 with a filing date of Jan. 30, 1987, (our ref.: U132-87).

(9) U.S. patent application Serial No. unknown, claiming priority based on Japanese Patent Application No. 62-19783 with a filing date of Jan. 30, 1987, (our ref.: U133-87).

(10) U.S. patent application Ser. No. unknown, claiming priority based on Japanese Patent Applications No. 62-19785 with a filing date of Jan. 30, 1987 and No. 62-19786 with a filing date of Jan. 30, 1987, (our ref.: U134-87).

BACKGROUND OF THE INVENTION

The present invention relates to a variable assist power steering system, and more particularly to an arrangement to bypass fluid flow so as to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should correspondingly minimized to permit the feedback of road "feel" from the tires to the driver. Secondary during medium and high speed passing and cornering maneouvres, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneouvres, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level assistance for high to medium speed on-center driving while having high levels of assistance for low speed and parking maneouvres, by exploiting the fact that, for most valves, the degree of assistance varies with the flow of oil. For example, in a known system as disclosed in JP No. 56-38430 B2, a bypass path with a solenoid operated variable flow orifice valve is connected between both ends of the power cylinder and the degree of opening of the variable flow orifice valve is controlled in response to vehicle speed to cause bypass flow to increase as vehicle speed increases. A potentional problem encountered in this system is that it is difficult for a variable flow orifice valve to exibit the same pressure drop characteristics for fluid flow passing therethrough in one direction as those for fluid flow passing therethrough in the opposite direction.

An object of the present invention is to improve a variable assist power steering system such that the fluid of a bypass flow is directed to pass through an externally controlled variable flow orifice in one direction only.

SUMMARY OF THE INVENTION

According to the present invention, a bypass flow comming out of one portion of a fluid flow distributor circuit of a power steering system during clockwise turning of a steering wheel and another bypass flow coming out another portion of the fluid flow distributor circuit during counterclockwise turning of the steering wheel are directed toward a fluid reservoir after passing through an externally controlled variable flow orifice.

In one form of the present invention, a normally closed change-over valve is arranged upstream of an externally controlled variable flow orifice. The change-over valve is shiftable from a spring set portion to one of second and third positions in response to a pressure differential created in a fluid flow distributor circuit or a power steering system. In the second position theroof, a bypass flow coming out of a portion of the fluid distributor circuit during clockwise turning of a steering wheel is allowed to pass through the externally controlled variable flow orifice in one direction and then to a fluid reservoir, whereas in the third position thereof, another bypass flow coming out of another portion of the fluid distributor circuit is allowed to pass through the externally controlled variable orifice in the same one direction and then to the fluid reservoir.

In another form of the present invention, a normally open change-over valve is disposed upstream of an externally controlled variable flow orifice. This change-valve is shiftable from a spring set position to one of second and third positions in response to a pressure differential created in a fluid flow distributor circuit of a power steering system. In the second position thereof, a bypass flow coming out of a portion of the fluid distributor circuit during clockwise turning of a steering wheel is allowed to pass through the externally controlled variable flow orifice in one direction and then to a fluid reservoir. In the third position thereof, a bypass flow coming out of another portion of the fluid flow distributor circuit is allowed to pass through the externally controlled variable flow orifice and then to the fluid reservoir. More specifically, this change-over valve comprises a valve housing formed with a blind ended bore, a first inlet port communicating with the one end of the bypassing arrangement, and a second inlet port communicating with the another end of the bypassing arrangement. Slidably positioned in the valve bore is a spool which is normally centered to assume a central rest position owing to two opposed forces by two springs. In this position, the spool defines on one end a first chamber and on the opposite end a second chamber. The first inlet port and second inlet port communicate with the first and second chambers, respectively. The spool is formed with an axial through passage which provides a restricted fluid flow communication between the first and second chambers. The valve housing is formed with an outlet port connected to the variable flow orifice valve. The outlet port is open to a circumferential groove with which the spool is formed. This groove communicates via a radial passage with the axial through passage. Thus, when the spool is in the central rest position, the first inlet port communicates via the first chamber, the axial through passage, the radial passage and the circumferential groove with the outlet port, whereas the second inlet port communicates via the second chamber, the axial through passage, the radial passage and the circumferential groove with the outlet port. Assuming the first inlet port is subjected to a relatively high pressure and the second inlet port is connected to a relatively low pressure, a pressure differential is created between the first and second chambers, urging the spool toward the second chamber to assume the second position where the second inlet port is closed by the spool. Assuming that the first inlet port is subjected to a relatively low pressure and the second inlet port is subjected to a relatively high pressure, the spool is urged towward the first chamber to assume the third position where the first inlet port is closed by the spool.

In still another form of the present invention, one-way check valves are disposed between one and another portions of a fluid distributor circuit of a power steering system from which portions bypass flows are to come out during clockwise and counterclockwise turning of a steering wheel, and an externally controlled variable flow orifice is disposed on discharge sides of the one-way check valves.

DETAILED DESCRIPTION OF THE INVENTION

Figure 1:
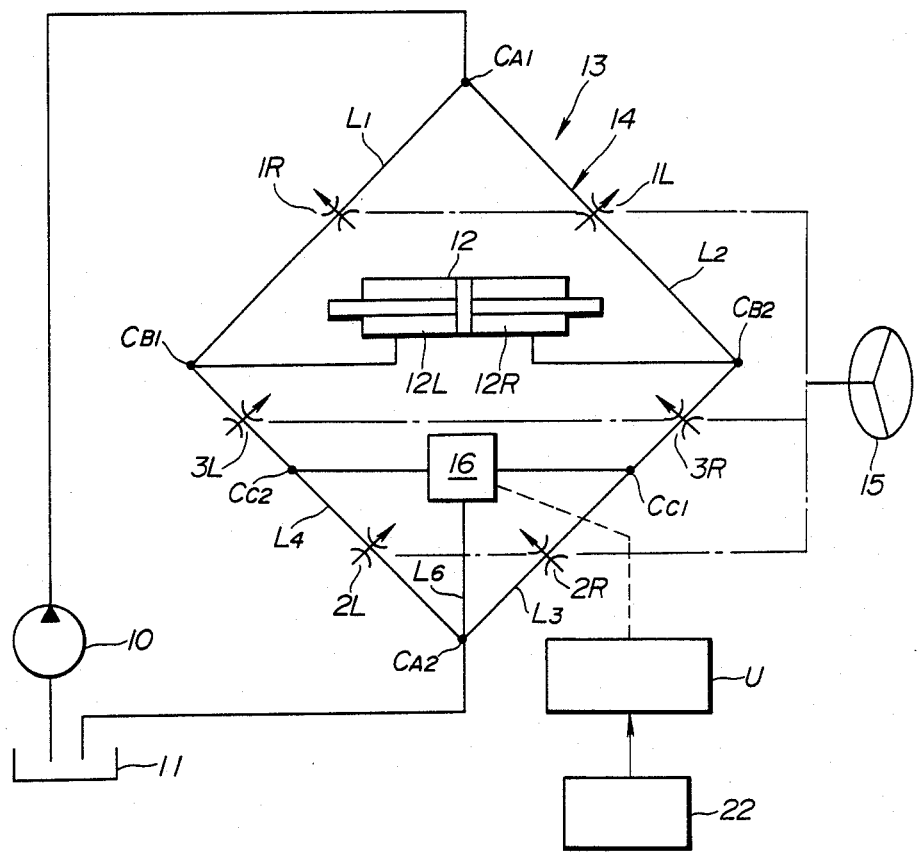
FIG. 1 is a hydraulic fluid circuit diagram of a variable assist power steering system.

FIG. 1 shows a hydraulic fluid circuit diagram of a variable assist power steering system which includes an oil pump 10 as a hydraulic fluid source, a tank 11 as a fluid reservoir, and a control valve 13 employing a fluid flow distributor circuit 14 of the open center type. Also shown are a steering wheel 15, a vehicle speed sensor 22, and a control unit U.

In the conventional manner, the fluid flow distributor circuit 14 includes two parallel fluid flow paths $L_1$-$L_4$ and $L_2$-$L_3$ connected between a pump fluid supply port $C_{A1}$ and a fluid return port $C_{A2}$. The flow path $L_2$-$L_3$ has a cylinder connection port $C_{B2}$ connected to a right turn cylinder chamber 12R of a power cylinder 12, while the other flow path $L_1$-$L_4$ has a cylinder connection port $C_{B1}$ connected to a left turn cylinder chamber 12L of the power cylinder 12. Arranged in an upstream section $L_1$ of the flow path $L_1$-$L_4$ and a downstream section $L_3$ of the other flow path $L_2$-$L_3$, respectively, are first and second main variable flow orifices 1R and 2R of the first kind which have an orifice area A decreasing as steering torque T increases in a pattern as illustrated by the fully drawn line in FIG. 2 during clockwise turning of the steering wheel 15. Arranged in an upstream section $L_2$ of the flow path $L_2$-$L_3$ and a downstream section $L_4$ of the flow path $L_1$-$L_4$ are first and second main variable flow orifices 1L and 2L of the second kind which have an orifice area A decreasing as steering torque T increases in a pattern as illustrated by the broken line in FIG. 2 during counterclockwise turning of the steering wheel 15. Arranged in the downstream section $L_3$ of the flow path $L_2$-$L_3$ upstream of the main variable flow orifice 2R is an auxiliary variable flow orifice 3R of the first kind which has an orifice flow area A decreasing as the steering torque T increases in a pattern as illustrated by the fully drawn line in FIG. 3 during clockwise turning of the steering wheel 15. Arranged in the downstream section $L_4$ of the flow path $L_1$-$L_4$ upstream of the main variable flow orifice 2L is an auxiliary variable flow orifice 3L of the first second kind which has an orifice flow area A decreasing as the steering torque T increases in a pattern as illustrated by the broken line in FIG. 3 during counterclockwise turning of the steering wheel 15. A connection point $C_{C1}$ at which the auxiliary variable flow orifice 3R is connected to the second main variable flow orifice 2R and a connection point $C_{C2}$ at which the auxiliary variable flow orifice 3L is connected to the second main variable flow orifice 2L are connected to input side of an externally controlled valve unit 16.

Figure 5:
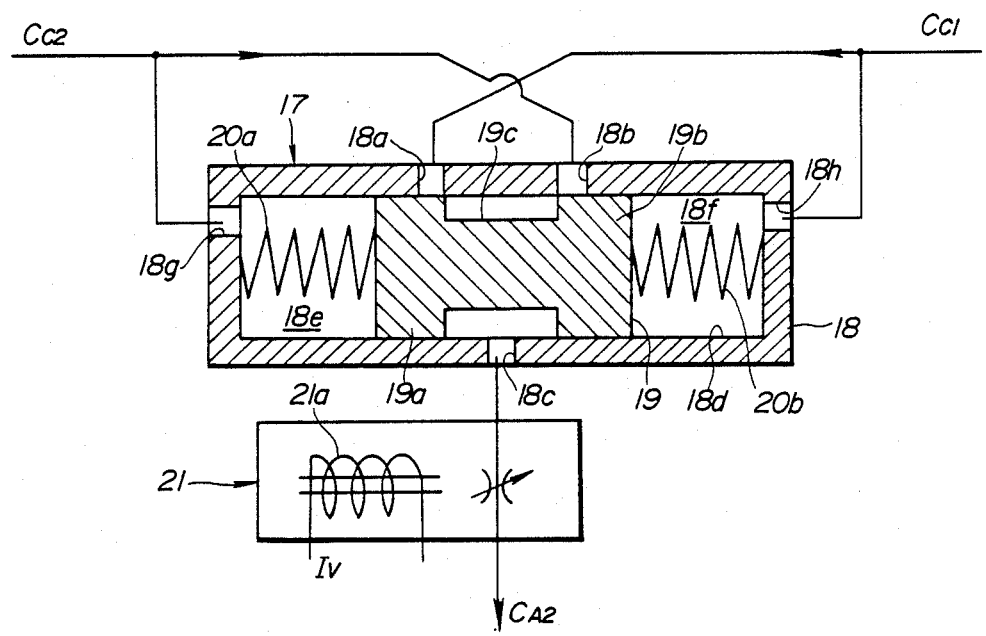
FIG. 5 shows a first embodiment of an externally controlled valve unit which defines an externally controlled variable flow orifice.

As shown in FIG. 5, the externally controlled valve unit 16 comprises a change-over valve 17 and an externally controlled variable orifice 21.

The change-over valve 17 includes a valve housing 18 formed with a bore 18d slidably receiving a spool 19. Also formed in the valve housing 18 are two inlet ports 18a and 18b and an outlet port 18c. The inlet port 18a, outlet port 8c and inlet port 18b are arranged in this order in the longitudinal direction of the valve housing 10. The spool 19 defines in the bore 18d a first chamber 18c on one end thereof and a second chamber 18E on the opposite end thereof. the valve housing 18 is also formed with a first bias pressure port 18g communicating with the first chamber 18e and a second bias pressure port 18h communicating with the second chamber 18f. The inlet port 18a is connected to the connection point $C_{C1}$, while the inlet port 18b is connected to the connection point $C_{C2}$. The first bias port 18g is connected to the connection point $C_{C2}$, while the second bias port 18h is connected to the connection point $C_{C1}$.

The spool 19 is formed with two axially spaced lands 19a and 19b separated by a groove 19c. Two return springs 10a and 20b are disposed in the chambers 18e and 18f to resiliently hold the spool 19 in a central spring set position as illustrated in FIG. 5, In this spring set position the lands 18a and 19b cover to close the inlet ports 18a and 18b, respectively. The groove 19c is always in communication with the outlet port 18c.

Figure 4:
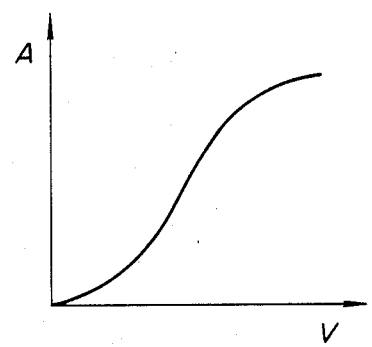
FIG. 4 is a graphical representation of the variation of flow area of an externally controlled variable flow orifice against some other variable except the steering torque, namely, a vehicle speed in this example.

The externally controlled variable flow orifice 21 is arranged in a bypass path $L_6$ connected between the outlet port 18c and the fluid return port $C_{A2}$ of the fluid flow distributor circuit 14. A flow area A of the variable flow orifice area 21 is variable with vehicle speed V in a manner as shown in FIG. 4. More specifically, a vehicle speed indicative output signal of the vehicle speed sensor 22 is supplied to the control unit U where electric current Iv to be supplied to a solenoid actuator 21a is determined. This current Iv causes the solenoid actuator 21a to vary the orifice flow area of the variable flow orifice 21 as shown by the curve in FIG. 4.

Figure 2:
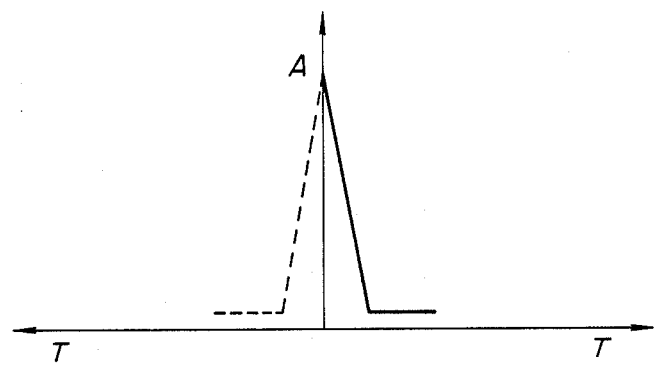
FIG. 2 is a graphical representation of variation of an orifice flow area of main variable flow orifices 1R, 1L, 2R, 2L, wherein the fully drawn line shows how the main variable flow orifices of the first kind (1R, 2R) decrease their orifice flow area (A) as steering torque (T) increases during clockwise turning of a steering wheel, and the broken line shows how the main variable flow orifices of the second kind (1L, 2L) decrease their orifice flow area (A) as the steering torque (T) increases during counterclockwise turning of the steering wheel.
Figure 3:
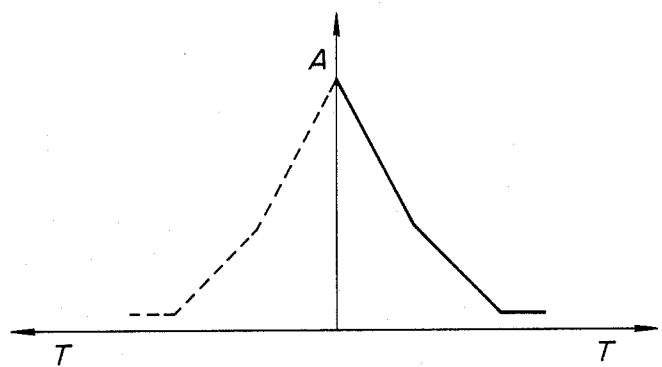
FIG. 3 is a graphical representation of variation of an orifice flow area of auxiliary variable flow orifices 3R, 3L, wherein the fully drawn line shows how the auxiliary variable flow orifice of the first kind (3R) decreases its orifice flow area (A) as steering torque (T) increases during clockwise turning of a steering wheel, and the broken line shows how the auxiliary variable flow orifice of the second kind (3L) decreases its orifice flow area (A) as the steering torque (T) increases during counterclockwise turning of the steering wheel.

Let us now assume that the vehicle speed is sufficiently high and the flow area A of the externally controlled variable flow orifice 21 is maximum. Turning the steering wheel 15 clockwise causes a pressure increase at the connection point $C_{C1}$ since the variable flow orifices 1R, 2R and 3R are restricted to decrease their flow areas as shown in FIGS. 2 and 3. Since the variable flow oriices 3L and 2L are opened, the connection point $C_{C2}$ is in substantially direct communication with the fluid reservoir 11. Thus, this pressure increase is transmitted to the second chamber 18f via the second bias pressure port 18b, while the first chamber 18e is in substantially direct communication with the fluid reservoir 11. This pressure differential created across the spool 19 causes the spool 19 to move to the left, as viewed in FIG. 5 to assume a second position. During this leftward movement of the spool 19, the land 19a uncovers the inlet port 18a. As a result, the inlet port 18a is allowed to communicate with the outlet port 18c via the groove 19c, allowing a bypass flow coming out of the connection point $C_{C1}$ to pass through the chang-over valve 17 and then through the variable flow orifice 21 toward the fluid reservoir 11. Turning the steering wheel 15 counterclockwise causes a pressure increase at the connection point $C_{C2}$. This pressure increase is transmitted to the first chamber 10e, causing the spool 19 to move to the right, as viewed in FIG. 5 to assume a third position. During this rightward movement of the spool 19, the land 19b uncovers the inlet port 18b, allowing the inlet port 18a to communicate with the outlet port 18G via the groove 19c. As a result, a bypass flow coming out of the connection port $C_{C2}$ is allowed to pass through the change-over valve 19 and then through the variable flow orifice 21 toward the fluid reservoir 11. As will now be understood from the previous description, the direction of fluid flow passing through the externally controlled variable flow orifice 21 has been limited to one direction only.

Figure 6:
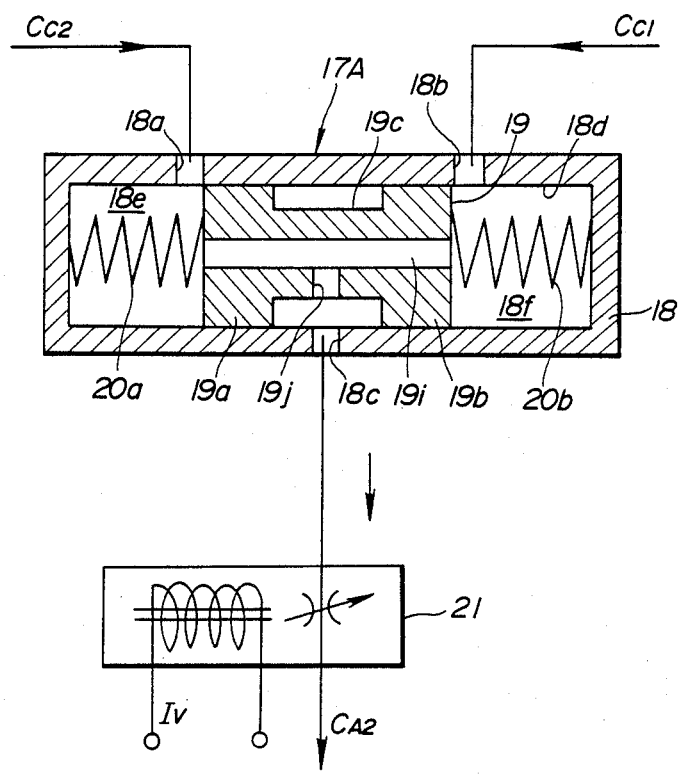
FIG. 6 shows a second embodiment.

Referring to FIG. 6, the second embodiment is explained. This embodiment has been devised to eliminate two bias ports 18g and 18h of the change-over valve 17. The bias ports 18g and 18h are provided in the change-over valve 17 shown in FIG. 5 to create a pressure differential across the spool 19 tending to move the spool 19 to one of the second and third positions. In the case of a change-over valve 17A illustrated in FIG. 6, a first inlet port 18a serves as a pressure bias port for a first chamber 18e, while a second inlet port 18b serves as a pressure bias port for a second chamber 18f. The first inlet port 18a and second inlet port 18b are connected to connection points $C_{C2}$ and $C_{C1}$ of the fluid flow distributor circuit 14 in this embodiment. In the illustrated spring set position, the first and second inlet ports 18a and 18b are in communication with an outlet port 18c via a slightly restricted axial through passage 19i formed through a spool 19, a radial passage 19j and a groove 19c. If the steering wheel 15 is turned clockwise, there occurs a pressure increase at the connection point $C_{C1}$. This pressure increase is transmitted to the second chamber 18f via the second inlet port 18b, while the first chamber 18e is in substantially direct communication with the fluid reservoir 11 via the first inlet port 18a and the second connection point $C_{C2}$. This pressure differential between the first and second chambers 18e and 18f is maintained temporarily owing to the provision of the restricted axial pasasge 19i. Thus, the spool 19 is urged to move to the left to a second position where the inlet port 18a is covered by a lands 19a. Counterclockwise turning of the steering wheel 15 causes a pressure increase in the first pressure chamber 20a. The pressure differential created temporarily cause the spool 19 to move to the right to a third position where the inlet port 18b is covered by a land 19b.

Figure 7:
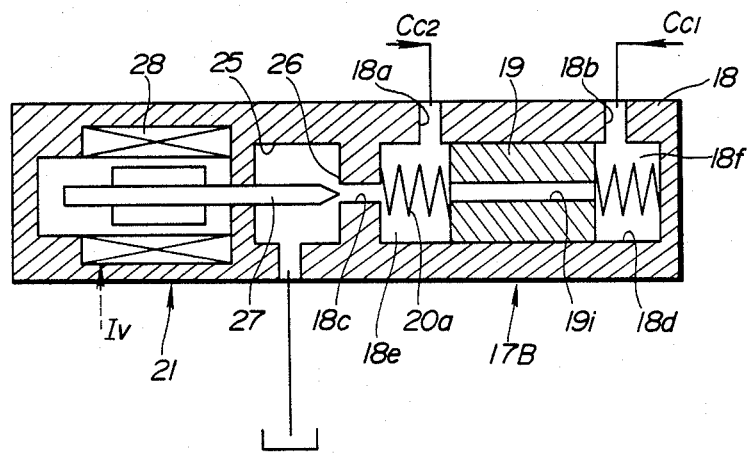
FIG. 7 shows a third embodiment.

Referring to FIG. 7, a third embodiment is explained. In this embodiment, a change-over valve 17B and an externally controlled variable flow orifice 21 are formed in an integral unit.

The change-over valve 17B comprises a spool 19 formed with an axial through passage 19i which serves as a flow restrictor. An outlet port 18c is formed is on the lefthand wall, as viewed in FIG. 7, of a first chamber 18e. A valve seat 26 is formed at the outlet port 18c and thus communicable with a valve chamber 25 which in turn communicates with a fluid fluid reservoir 11 via a fluid return port $C_{A2}$ (see FIG. 1). An externally controlled variable flow orifice 21 comprises a proportional solenoid 21 and a needle 27 adapted to engage the valve seat 26 to vary the flow area of fluid passing through the outlet port 18c. In response to electric current Iv passing through the solenoid 21, the solenoid 28 controls movement of the needle 27 so as to vary the flow area.

Figure 8:
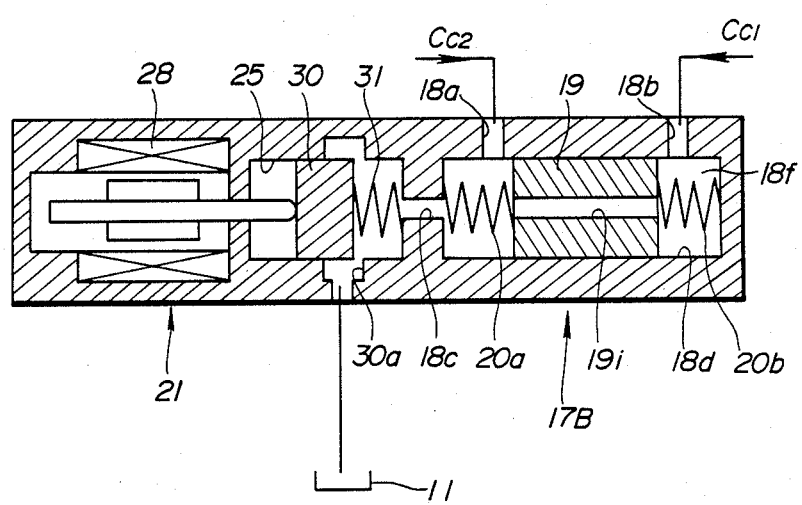
FIG. 8 shows a fourth embodiment.

FIG. 8 shows a fourth embodiment which is substantially the same as the third embodiment just described. This fourth embodiment employs a spool valve instead of the needle valve. The spool valve comprises a spool 30 adapted to cover an outlet port 30a of a valve chamber 25, a return spring 31, and a proportional type solenoid actuator 28. In this case the edge of the spool 20 and the outlet port 30a cooperate to define a variable flow orifice.

Figure 9:
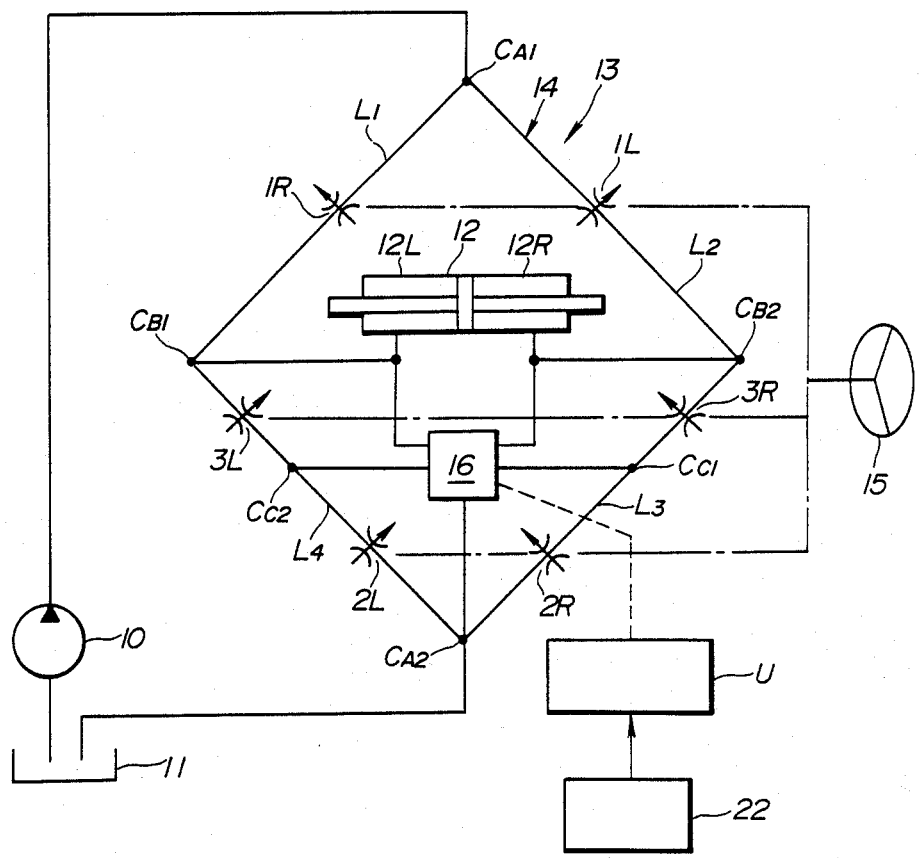
FIG. 9 is a hydraulic fluid circuit diagram of a power steering system employing a fifth embodiment of an externally controlled valve.
Figure 10:
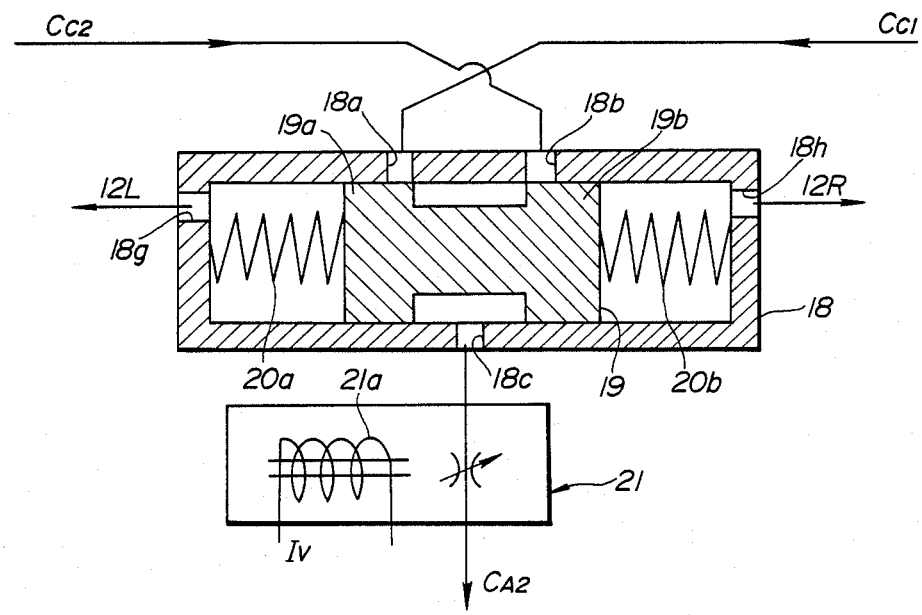
FIG. 10 shows the detail of the externally controlled valve used in FIG. 9.

Referring to FIGS. 9 and 10, a fifth embodiment is described. This embodiment is substantially the same as the first embodiment described in connection with FIGS. 1 to 5 except that a first bias pressure port 18g is connected to a left turn cylinder chamber 12L of a power cylinder and a second bias pressure port 18h is connected to a right turn cylinder chamber 12R thereof. This arrangement is advantageous in that the movement of spool 19 against the bias forces of return springs 20a and 20b becomes quick since the pressure differential created in the power cylinder 12 is considerably large.

Figure 11:
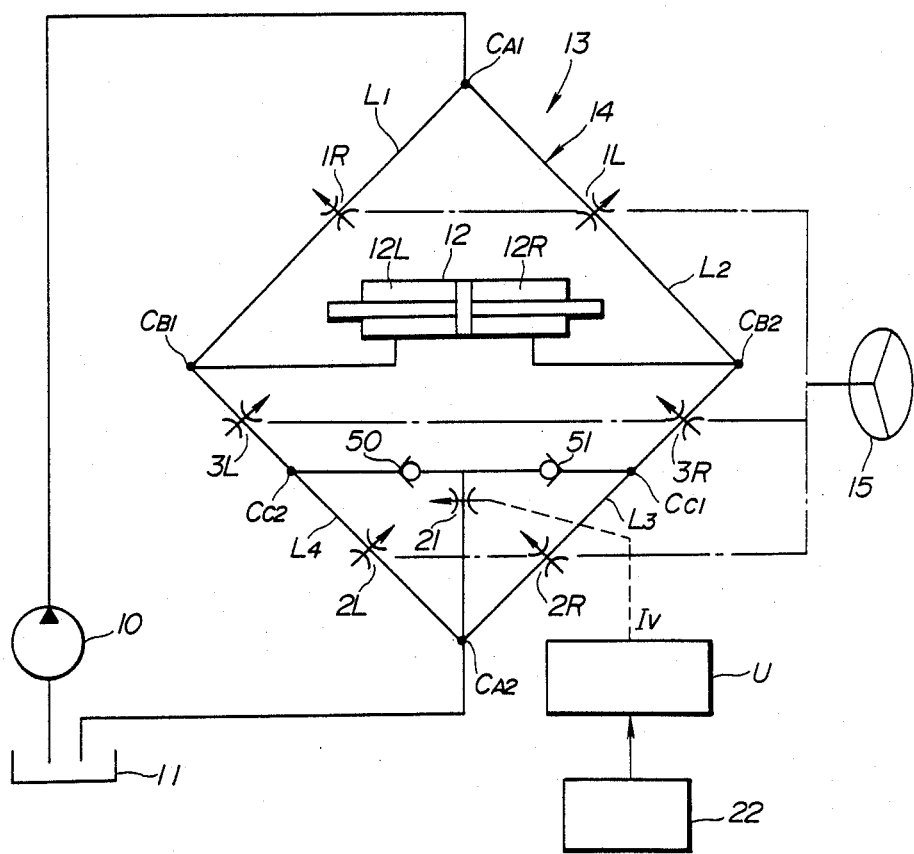
FIG. 11 is a hydraulic fluid circuit diagram of a power steering system employing a sixth embodiment according to the present invention.

Lastly, a sixth embodiment illustrated in FIG. 11 is explained. In this embodiment, two check valves 50 and 51 are arranged in such a manner as to serve as a change over valve. As will be readily understood from FIG. 11, if a pressue differential is created between two connection points $C_{C1}$ and $C_{C2}$, a bypass flow comming out of one of the connection points only is allowed to pass through an externally controlled variable flow orifice 21 owing to the check-valves 50 and 51.

What is claimed is:

1. A variable assist power steering system for a vehicle including a steering wheel, a hydraulic fluid source, a fluid reservoir, a hydraulic pressure operated power cylinder adapted to be connected to a steering linkage, comprising:
   a control valve including a fluid flow distributor circuit conected between the fluid source and the fluid reservoir to produce a pressure differential in the power cylinder in response to a steering torque by the steering wheel; and
   a circuit arrangement whereby a bypass flow coming out of one portion of the fluid flow distributor circuit during clockwise turning of the steering wheel and another bypass flow coming out another portion of the fluid flow distributor circuit during counterclockwise turning of the steering wheel are directed toward the fluid reservoir after passing through an externally controlled variable flow orifice which has an orifice flow area variable in response to some other variable different from the steering torque.

2. A variable assist power steering system as claimed in claim 1, wherein said circuit arrangement comprisesa a change-over valve disposed upstream of said externally controlled variable flow orifice.

3. A variable assist power steering system as claimed in claim 2, wherein said change-over valve is shiftable from a spring set portion to one of second and third positions in response to a pressure differential created in said fluid flow distributor circuit, and in the second position thereof, a bypass flow coming out of the portion of said fluid flow distributor circuit during clockwise turning of the steering wheel is allowed to pass through said externally controlled variable flow orifice in one direction and then to the fluid reservoir, whereas in the third position thereof, another bypass flow coming out of the another portion of the fluid distributor circuit is allowed to pass through the externally controlled variable flow orifice in the same one direction and then to the fluid reservoir.

4. A variable assist power steering system as claimed in claim 3, wherein said change-over valve is of the normally closed type.

5. A variable assist power steering system as claimed in claim 4, wherein said change-over valve includes a spool movable in response to a pressure differential created between the one and the another portions of the fluid flow distributor circuit.

6. A variable assist power steering system as claimed in claim 4, wherein said change-over valve includes a spool movable in response to said pressure differential created in the power cylinder.

7. A variable assist power steering system as claimed in claim 3, wherein said change-over valve is of the normally open type.

8. A variable assist power steering system as claimed in claim 7, wherein said change-over valve includes a spool formed with an axial through passage which provides a restricted fluid flow communication between two pressure chambers separated by said spool, whereby a presure differential between said pressure chambers is temporarily maintained to cause a bias to the movement of said spool.

9. A variable assist power steering system as claimed in claim 1, wherein said circuit arrangement comprises one-way check valves which are disposed between the one and another portions of the fluid flow distributor circuit.

* * * * *